US012445783B2

(12) United States Patent
Azhirnian et al.

(10) Patent No.: US 12,445,783 B2
(45) Date of Patent: Oct. 14, 2025

(54) ELECTROMAGNETIC TRANSDUCER WITH PIEZOELECTRIC SPRING

(71) Applicant: Cochlear Limited, Macquarie University (AU)

(72) Inventors: Armin Azhirnian, Mölnlycke (SE); Henrik Fyrlund, Mölnlycke (SE); Tommy Bergs, Mölnlycke (SE)

(73) Assignee: Cochlear Limited, Macquarie University (AU)

( * ) Notice: Subject to any disclaimer, the term of this patent is extended or adjusted under 35 U.S.C. 154(b) by 168 days.

(21) Appl. No.: 18/548,155

(22) PCT Filed: Mar. 15, 2022

(86) PCT No.: PCT/IB2022/052344

§ 371 (c)(1),
(2) Date: Aug. 28, 2023

(87) PCT Pub. No.: WO2022/208214

PCT Pub. Date: Oct. 6, 2022

(65) Prior Publication Data

US 2024/0147168 A1 May 2, 2024

Related U.S. Application Data

(60) Provisional application No. 63/168,693, filed on Mar. 31, 2021.

(51) Int. Cl.
*H04R 17/10* (2006.01)
*H04R 25/00* (2006.01)

(52) U.S. Cl.
CPC ............. *H04R 17/10* (2013.01); *H04R 25/48* (2013.01); *H04R 25/606* (2013.01); *H04R 2460/13* (2013.01)

(58) Field of Classification Search
CPC ...... H04R 17/10; H04R 25/48; H04R 25/606; H04R 2460/13
See application file for complete search history.

(56) References Cited

U.S. PATENT DOCUMENTS 5,867,450 A * 2/1999 Rogers .................. H04R 17/10 367/176
9,432,782 B2 8/2016 Gustafsson et al.
(Continued)

FOREIGN PATENT DOCUMENTS

EP 2810456 6/2019

OTHER PUBLICATIONS

International Search Report and Written Opinion for PCT Application No. PCT/IB2022/052344 dated Jun. 15, 2022 in 12 pages.

*Primary Examiner* — Mark Fischer
(74) *Attorney, Agent, or Firm* — Knobbe Martens Olson & Bear LLP

(57) ABSTRACT

An apparatus includes a bobbin, at least one counterweight assembly, and at least one spring. The bobbin includes at least one core and at least one electrically conductive coil wound around at least a portion of the bobbin. The at least one counterweight assembly is configured to move in response to magnetic fields generated by the bobbin. The at least one spring is in mechanical communication with the at least one counterweight assembly. The at least one spring is configured to resiliently deform in response to movement of the at least one counterweight assembly. The at least one spring includes at least one piezoelectric element.

25 Claims, 10 Drawing Sheets

(56) References Cited

U.S. PATENT DOCUMENTS

| | | | | |
|---|---|---|---|---|
| 9,716,953 | B2 | 7/2017 | Andersson et al. | |
| 2003/0034705 | A1* | 2/2003 | Hakansson | H04R 9/066 310/81 |
| 2006/0045298 | A1* | 3/2006 | Westerkull | H02K 33/18 381/322 |
| 2009/0253951 | A1 | 10/2009 | Ball et al. | |
| 2010/0298626 | A1* | 11/2010 | Andersson | H04R 17/00 600/25 |
| 2012/0083860 | A1* | 4/2012 | Hakansson | H04R 25/606 607/57 |
| 2014/0270297 | A1* | 9/2014 | Gustafsson | H04R 25/606 381/326 |
| 2016/0037274 | A1 | 2/2016 | Andersson et al. | |
| 2018/0288539 | A1 | 10/2018 | Bervoets | |
| 2019/0230455 | A1* | 7/2019 | Andersson | H04R 25/606 |
| 2022/0312108 | A1* | 9/2022 | Zhang | H04R 25/606 |

* cited by examiner

ELECTROMAGNETIC TRANSDUCER WITH PIEZOELECTRIC SPRING

BACKGROUND

Field

The present application relates generally to an electromagnetic actuator for generating vibrations, and more specifically, to implantable electromagnetic actuator of an auditory prostheses for generating auditory vibrations.

Description of the Related Art

Medical devices have provided a wide range of therapeutic benefits to recipients over recent decades. Medical devices can include internal or implantable components/devices, external or wearable components/devices, or combinations thereof (e.g., a device having an external component communicating with an implantable component). Medical devices, such as traditional hearing aids, partially or fully-implantable hearing prostheses (e.g., bone conduction devices, mechanical stimulators, cochlear implants, etc.), pacemakers, defibrillators, functional electrical stimulation devices, and other medical devices, have been successful in performing lifesaving and/or lifestyle enhancement functions and/or recipient monitoring for a number of years.

The types of medical devices and the ranges of functions performed thereby have increased over the years. For example, many medical devices, sometimes referred to as "implantable medical devices," now often include one or more instruments, apparatus, sensors, processors, controllers or other functional mechanical or electrical components that are permanently or temporarily implanted in a recipient. These functional devices are typically used to diagnose, prevent, monitor, treat, or manage a disease/injury or symptom thereof, or to investigate, replace or modify the anatomy or a physiological process. Many of these functional devices utilize power and/or data received from external devices that are part of, or operate in conjunction with, implantable components.

SUMMARY

In one aspect disclosed herein, an apparatus comprises a bobbin, at least one counterweight assembly, and at least one spring. The bobbin comprises at least one core and at least one electrically conductive coil wound around at least a portion of the bobbin. The at least one counterweight assembly is configured to move in response to magnetic fields generated by the bobbin. The at least one spring is in mechanical communication with the at least one counterweight assembly. The at least one spring is configured to resiliently deform in response to movement of the at least one counterweight assembly. The at least one spring comprises at least one piezoelectric element.

In another aspect disclosed herein, a method comprises vibrating at least one mass in response to oscillating magnetic fields generated by an electromagnet. The at least one mass is in mechanical communication with at least one resilient member comprising at least one piezoelectric element. The method further comprises applying at least one electrical signal to the at least one piezoelectric element. The method further comprises, in response to the at least one electrical signal, moving the at least one mass and/or changing a stiffness of the at least one resilient member.

In another aspect disclosed herein, an apparatus comprises at least one electromagnet, at least one mass in operative communication with the at least one electromagnet, and at least one resilient member comprising at least one piezoelectric element. The at least one resilient member comprises a first portion affixed to the at least one mass. The at least one mass is configured to vibrate in response to oscillating magnetic fields generated by the at least one electromagnet.

BRIEF DESCRIPTION OF THE DRAWINGS

Implementations are described herein in conjunction with the accompanying drawings, in which.

DETAILED DESCRIPTION

Certain implementations described herein provide an electromagnetic transducer (e.g., actuator) configured to be implanted within or on a recipient's body and having a spring that includes a piezoelectric element. The piezoelectric element can be configured to be driven by oscillating electrical signals to generate additional vibrations (e.g., high frequency output) that supplement the vibrations generated by driving the electromagnet with oscillating electrical current (e.g., low frequency output) using the same counterweight. The piezoelectric element can be driven in parallel or in series with the driving of the electromagnet (e.g., using the same or separate amplifier circuitry). The piezoelectric element can be configured to be driven by electrical signals having a non-zero DC component to offset and/or modify a stiffness of the spring (e.g., to adjust a balance point of the electromagnetic transducer; to compensate an off-centered balance point of the electromagnetic transducer; to adjust a sensitivity of the electromagnetic transducer; to provide more output from the electromagnetic transducer).

The teachings detailed herein are applicable, in at least some implementations, to any type of implantable medical device (e.g., implantable stimulation system) comprising a first portion implanted on or within the recipient's body and configured to provide vibrations to a portion of the recipient's body Implementations can include any type of medical device that can utilize the teachings detailed herein and/or variations thereof. Furthermore, while certain implementations are described herein in the context of implantable devices, certain other implementations are compatible in the context of non-implantable devices. For example, fine adjustments to align components of an optical sensor system (e.g., adjusting laser spot positioning) or larger ranges of sensitivities of sensors (e.g., microphones; vibration sensors) can be provided, at least in part, by at least one piezoelectric element in at least one spring of a non-implantable electromagnetic transducer.

Merely for ease of description, apparatus and methods disclosed herein are primarily described with reference to an illustrative medical device, namely an active transcutaneous bone conduction auditory prosthesis. However, the teachings detailed herein and/or variations thereof may also be used with a variety of other medical devices that provide a wide range of therapeutic benefits to recipients, patients, or other users. In some implementations, the teachings detailed herein and/or variations thereof can be utilized in other types of devices beyond auditory prostheses that may benefit from fine adjustments of the electromagnetic transducer performance and/or supplemental ranges of vibrational frequencies of vibrations generated by the electromagnetic transducer.

Figure 1A:
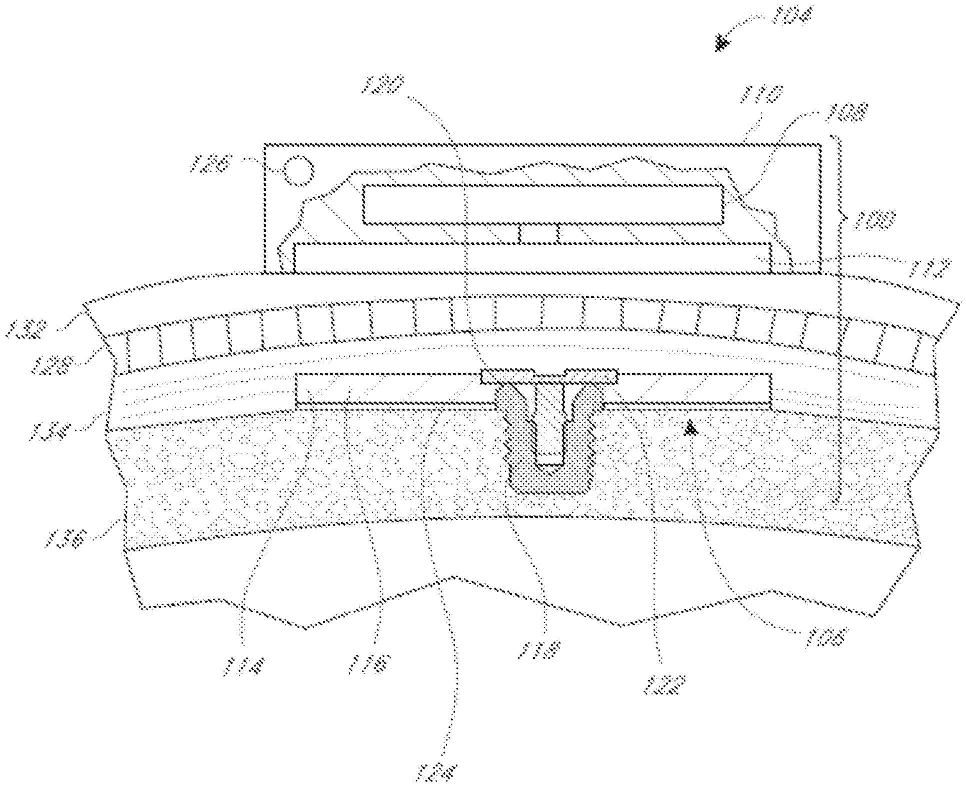
FIG. 1A schematically illustrates a portion of an example transcutaneous bone conduction device implanted in a recipient in accordance with certain implementations described herein.
Figure 1B:
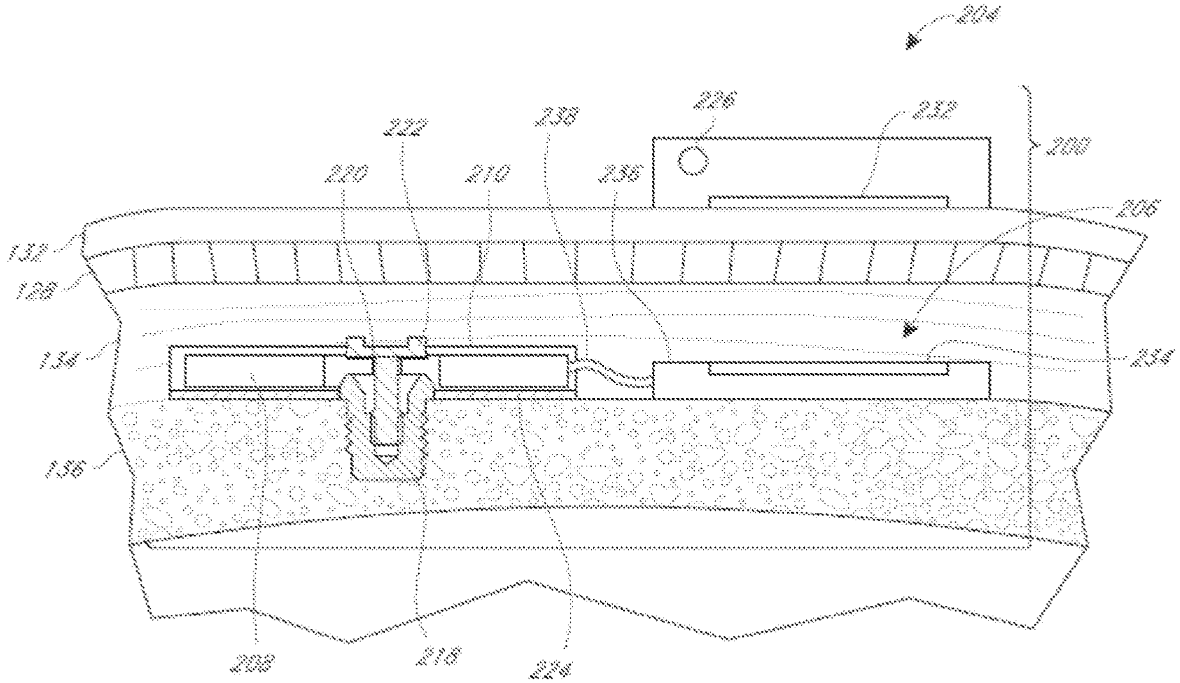
FIG. 1B schematically illustrate a portion of another example transcutaneous bone conduction device implanted in a recipient in accordance with certain implementations described herein.

FIG. 1A schematically illustrates a portion of an example transcutaneous bone conduction device 100 implanted in a recipient in accordance with certain implementations described herein. FIG. 1B schematically illustrate a portion of another example transcutaneous bone conduction device 200 implanted in a recipient in accordance with certain implementations described herein.

The example transcutaneous bone conduction device 100 of FIG. 1A includes an external device 104 and an implantable component 106. The transcutaneous bone conduction device 100 of FIG. 1A is a passive transcutaneous bone conduction device in that a vibrating actuator 108 is located in the external device 104 and delivers vibrational stimuli through the skin 132 to the skull 136. The vibrating actuator 108 is located in a housing 110 of the external component 104 and is coupled to a plate 112. The plate 112 can be in the form of a permanent magnet and/or in another form that generates and/or is reactive to a magnetic field, or otherwise permits the establishment of magnetic attraction between the external device 104 and the implantable component 106 sufficient to hold the external device 104 against the skin 132 of the recipient.

In certain implementations, the vibrating actuator 108 is a device that converts electrical signals into vibration. In operation, a sound input element 126 can convert sound into electrical signals. Specifically, the transcutaneous bone conduction device 100 can provide these electrical signals to the vibrating actuator 108, or to a sound processor (not shown) that processes the electrical signals, and then provides those processed signals to the vibrating actuator 108. The vibrating actuator 108 can convert the electrical signals (processed or unprocessed) into vibrations. Because the vibrating actuator 108 is mechanically coupled to the plate 112, the vibrations are transferred from the vibrating actuator 108 to the plate 112. The implanted plate assembly 114 is part of the implantable component 106 and is made of a ferromagnetic material that may be in the form of a permanent magnet, that generates and/or is reactive to a magnetic field, or otherwise permits the establishment of a magnetic attraction between the external device 104 and the implantable component 106 sufficient to hold the external device 104 against the skin 132 of the recipient. Accordingly, vibrations produced by the vibrating actuator 108 of the external device 104 are transferred from the plate 112 across the skin 132 to a plate 116 of the plate assembly 114. This can be accomplished as a result of mechanical conduction of the vibrations through the skin 132, resulting from the external device 104 being in direct contact with the skin 132 and/or from the magnetic field between the two plates 112, 116. These vibrations are transferred without a component penetrating the skin 132, fat 128, or muscular 134 layers on the head.

In certain implementations, the implanted plate assembly 114 is substantially rigidly attached to a bone fixture 118. The implantable plate assembly 114 can include a through hole 120 that is contoured to the outer contours of the bone fixture 118. This through hole 120 thus forms a bone fixture interface section that is contoured to the exposed section of the bone fixture 118. In certain implementations, the sections are sized and dimensioned such that at least a slip fit or an interference fit exists with respect to the sections. A screw 122 can be used to secure the plate assembly 114 to the bone fixture 118. In certain implementations, a silicone layer 124 is located between the plate 116 and the bone 136 of the skull.

As can be seen in FIG. 1A, the head of the screw 122 is larger than the hole through the implantable plate assembly 114, and thus the screw 122 positively retains the implantable plate assembly 114 to the bone fixture 118. The portions of the screw 122 that interface with the bone fixture 118 substantially correspond to an abutment screw, thus permitting the screw 122 to readily fit into an existing bone fixture used in a percutaneous bone conduction device. In certain implementations, the screw 122 is configured so that the same tools and procedures that are used to install and/or remove an abutment screw from the bone fixture 118 can be used to install and/or remove the screw 122 from the bone fixture 118.

As schematically illustrated by FIG. 1B, an example transcutaneous bone conduction device 200 comprises an external device 204 and an implantable component 206. The device 200 is an active transcutaneous bone conduction device in that the vibrating actuator 208 is located in the implantable component 206. For example, a vibratory element in the form of a vibrating actuator 208 is located in a housing 210 of the implantable component 206. In certain implementations, much like the vibrating actuator 108 described herein with respect to the transcutaneous bone conduction device 100, the vibrating actuator 208 is a device that converts electrical signals into vibration. The vibrating actuator 208 can be in direct contact with the outer surface of the recipient's skull 136 (e.g., the vibrating actuator 208 is in substantial contact with the recipient's bone 136 such that vibration forces from the vibrating actuator 208 are communicated from the vibrating actuator 208 to the recipient's bone 136). In certain implementations, there can be one or more thin non-bone tissue layers (e.g., a silicone layer 224) between the vibrating actuator 208 and the recipient's bone 136 (e.g., bone tissue) while still permitting sufficient support so as to allow efficient communication of the vibration forces generated by the vibrating actuator 208 to the recipient's bone 136.

In certain implementations, the external component 204 includes a sound input element 226 that converts sound into electrical signals. Specifically, the device 200 provides these electrical signals to the vibrating actuator 208, or to a sound processor (not shown) that processes the electrical signals, and then provides those processed signals to the implantable component 206 through the skin of the recipient via a magnetic inductance link. For example, a transmitter coil

232 of the external component 204 can transmit these signals to an implanted receiver coil 234 located in a housing 236 of the implantable component 206. Components (not shown) in the housing 236, such as, for example, a signal generator or an implanted sound processor, then generate electrical signals to be delivered to the vibrating actuator 208 via electrical lead assembly 238. The vibrating actuator 208 converts the electrical signals into vibrations. In certain implementations, the vibrating actuator 208 can be positioned with such proximity to the housing 236 that the electrical leads 238 are not present (e.g., the housing 210 and the housing 238 are the same single housing containing the vibrating actuator 208, the receiver coil 234, and other components, such as, for example, a signal generator or a sound processor).

In certain implementations, the vibrating actuator 208 is mechanically coupled to the housing 210. The housing 210 and the vibrating actuator 208 collectively form a vibrating element. The housing 210 can be substantially rigidly attached to a bone fixture 218. In this regard, the housing 210 can include a through hole 220 that is contoured to the outer contours of the bone fixture 218. The screw 222 can be used to secure the housing 210 to the bone fixture 218. As can be seen in FIG. 1B, the head of the screw 222 is larger than the through hole 220 of the housing 210, and thus the screw 222 positively retains the housing 210 to the bone fixture 218. The portions of the screw 222 that interface with the bone fixture 218 substantially correspond to the abutment screw detailed below, thus permitting the screw 222 to readily fit into an existing bone fixture used in a percutaneous bone conduction device (or an existing passive bone conduction device). In certain implementations, the screw 222 is configured so that the same tools and procedures that are used to install and/or remove an abutment screw from the bone fixture 218 can be used to install and/or remove the screw 222 from the bone fixture 218.

The example transcutaneous bone conduction auditory device 100 of FIG. 1A comprises an external sound input element 126 (e.g., external microphone) and the example transcutaneous bone conduction auditory device 200 of FIG. 1B comprises an external sound input element 226 (e.g., external microphone). Other example auditory devices (e.g., totally implantable transcutaneous bone conduction devices) in accordance with certain implementations described herein can replace the external sound input element 126, 226 with a subcutaneously implantable sound input assembly (e.g., implanted microphone).

Figure 2A:
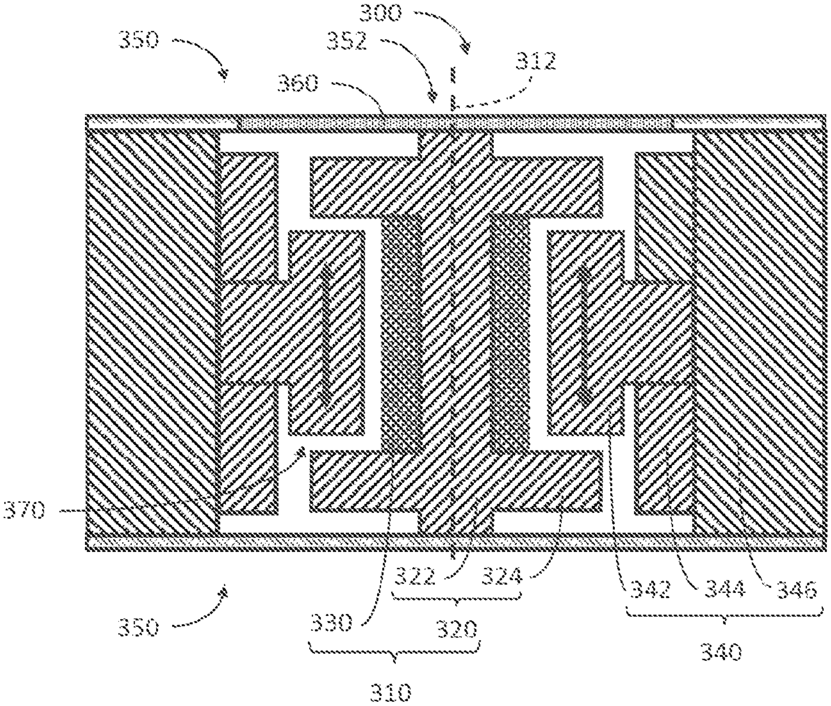
FIGS. 2A and 2B schematically illustrate cross-sectional views of two example apparatus in accordance with certain implementations described herein.
Figure 2B:
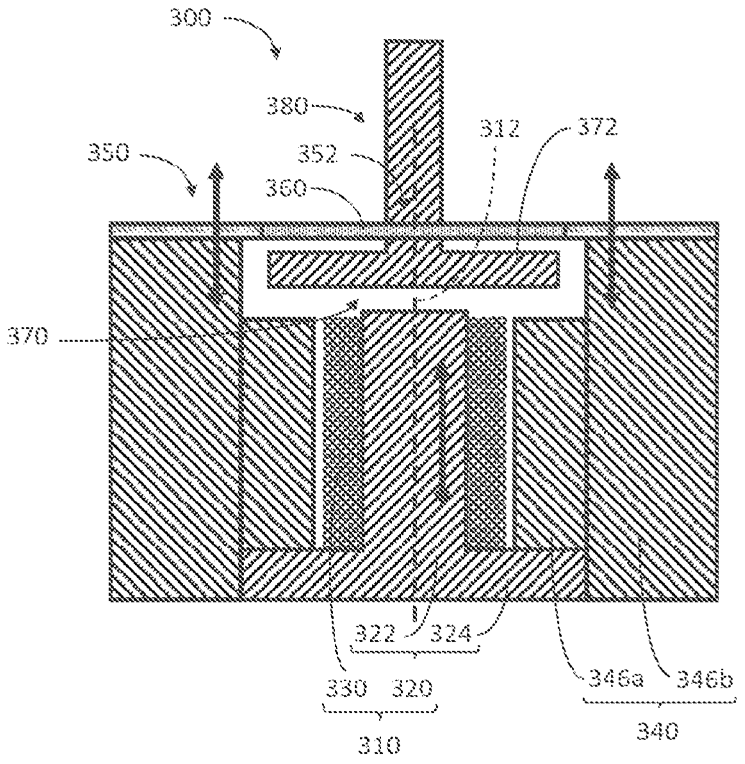

Each of FIGS. 2A and 2B schematically illustrates a cross-sectional view of an example apparatus 300 in accordance with certain implementations described herein. The apparatus 300 comprises a bobbin 310 comprising at least one core 320 and at least one electrically conductive coil 330 wound around at least a portion of the bobbin 310. The apparatus 300 further comprises at least one counterweight assembly 340 configured to move in response to magnetic fields generated by the bobbin 310. The apparatus 300 further comprises at least one spring 350 in mechanical communication with the at least one counterweight assembly 340. The at least one spring 350 is configured to resiliently deform (e.g., bend) in response to movement of the at least one counterweight assembly 340 and the at least one spring 350 comprises at least one piezoelectric element 360. For example, the at least one piezoelectric element 360 can be configured to resiliently deform (e.g., bend) in response to the movement of the at least one counterweight assembly 340.

In the example apparatus 300 of FIG. 2A (e.g., a balanced electromagnetic actuator), a portion 352 of the at least one spring 350 is affixed to the bobbin 310 (e.g., which is configured to be in mechanical communication with a fixture affixed to a portion of the recipient's body). The at least one counterweight assembly 340 is spaced from the bobbin 310 by an air gap 370 and is configured to move (e.g., vibrate) relative to the bobbin 310 (denoted by the two double-headed arrows) in response to the magnetic fields thereby flexing the at least one spring 350 about the bobbin 310 (e.g., about the portion 352 of the at least one spring 350 affixed to the bobbin 310). In the example apparatus 300 of FIG. 2B (e.g., an unbalanced electromagnetic actuator), a portion 352 of the at least one spring 350 is affixed to an abutment 380 (e.g., a substantially stationary member that can be configured to be in mechanical communication with a fixture affixed to a portion of the recipient's body), the bobbin 310 is spaced from the abutment 380 by an air gap 370, and the at least one counterweight assembly 340 and the bobbin 310 move (e.g., vibrate) as a unitary element relative to the abutment 380 (denoted by the three double-headed arrows) in response to the magnetic fields thereby flexing the at least one spring 350 about the abutment 380 (e.g., about the portion 352 of the at least one spring 350 affixed to the abutment 380).

In certain implementations, the apparatus 300 is at least a portion of a vibrating electromagnetic actuator (e.g., a balanced actuator as shown in FIG. 2A; an unbalanced actuator as shown in FIG. 2B) configured to receive electrical signals and to generate vibrations indicative of the received electrical signals. In certain other implementations, the apparatus 300 is at least a portion of an electromagnetic transducer configured to receive vibrations and to output a signal indicative of the received vibrations. The apparatus 300 can be part of a percutaneous bone conduction device, a transcutaneous bone conduction device, and/or other types of devices (e.g., medical devices; prostheses) configured to be in mechanical communication with at least a portion of the recipient's body and to receive and/or transmit vibrations to the recipient's body. For example, the apparatus 300 can be configured to be in mechanical communication with a fixture (e.g., osseointegrated bone fixture 118, 218 and screw 122, 222) implanted into a bone surface of the recipient's body and configured to transmit the vibrations generated by the apparatus 300 to the recipient's body such that the vibrations evoke a hearing precept by the recipient (e.g., to mechanically vibrate the skull bone of the recipient, the vibrations received by the recipient's cochlea to compensate for conductive hearing loss, mixed hearing loss, or single-sided deafness). The vibrations of the at least one counterweight assembly 340 resulting from the magnetic fields generated by the bobbin 310 can be in a range of vibrational frequencies of 250 Hz to 8 kHz.

The apparatus 300 of certain implementations further comprises a housing (e.g., housing 110, 210) configured to hermetically seal an internal region of the apparatus 300 from the surrounding environment. The housing of certain implementations comprises at least one biocompatible material (e.g., ceramic; titanium; titanium alloy) and is configured to provide vibrational isolation such that the fixture is substantially the only pathway through which vibrations travel between the apparatus 300 and the recipient's body.

In certain implementations, the bobbin 310 has a substantially circular cross-section in a plane perpendicular to a longitudinal axis 312 of the bobbin 310 (e.g., is radially symmetric about the longitudinal axis 312), while in certain other implementations, the bobbin 310 has other cross-sectional shapes (e.g., polygonal; rectangular; square). In certain implementations, the core 320 comprises a ferrimagnetic or ferromagnetic material (e.g., iron, iron alloy; magnetic stainless steel; ferrite) and is a unitary (e.g., monolithic) element comprising multiple portions permanently joined to one another. The core 320 can comprise a cylindrical portion 322 and at least one flange portion 324 extending radially away from the cylindrical portion 322. In certain implementations, the coil 330 comprises multiple turns of electrically insulated single-strand or multi-strand platinum or gold wire. The coil 330 is wound around at least part of the cylindrical portion 322 of the core 320 (e.g., multiple layers of windings around the cylindrical portion 322 as shown in FIGS. 2A and 2B). By flowing an oscillating (e.g., alternating) electrical current through the coil 330, an oscillating magnetic field H(t) can be generated and emanated from the core 320.

As schematically illustrated by FIG. 2A, the at least one counterweight assembly 340 of certain implementations comprises at least one permanent magnet 342 comprising a magnetized ferromagnetic material (e.g., Fe, Ni, Co, and/or alloys of one or more of Fe, Ni, Co; alnico, ferrite; rare-earth alloy; NdFeB alloy), at least one magnetic yoke 344 comprising a ferrimagnetic or ferromagnetic material (e.g., iron, iron alloy; magnetic stainless steel; ferrite), and at least one mass 346. The at least one permanent magnet 342 and the at least one magnetic yoke 344 are configured to move with the at least one mass 346 in response to the magnetic field generated by the bobbin 310 producing attractive and repulsive forces with the at least one permanent magnet 342 and the at least one magnetic yoke 344. As schematically illustrated by FIG. 2B, the at least one counterweight assembly 340 of certain implementations comprises at least one mass 346 (e.g., masses 346*a*, 346*b*; without at least one permanent magnet 342 or at least one magnetic yoke 344) that is affixed to the bobbin 310 and a permanent magnet portion 372 of the abutment 380 comprises a magnetized ferromagnetic material (e.g., Fe, Ni, Co, and/or alloys of one or more of Fe, Ni, Co; alnico, ferrite; rare-earth alloy; NdFeB alloy). The at least one counterweight assembly 340 of FIG. 2B is configured to move with the bobbin 310 in response to the magnetic field generated by the bobbin 310 producing attractive and repulsive forces with the permanent magnet portion 372 of the abutment 380.

In certain implementations, the at least one spring 350 is configured to resiliently distort (e.g., bend; flex) about the portion 352 of the at least one spring 350 in response to the movement of the at least one counterweight assembly 340 and to apply a restoring force on the at least one counterweight assembly 340. The magnetic force and the restoring force cause the at least one counterweight assembly 340 to oscillate or vibrate. In certain implementations, the moving portion of the apparatus 300 (e.g., comprising the at least one counterweight assembly 340 in FIG. 2A; comprising the at least one counterweight assembly 340 and the bobbin 310 in FIG. 2B) is configured to oscillate or vibrate within the confines of the housing without being encumbered by the housing. The at least one mass 346 of certain implementations comprises one or more materials having sufficiently large mass density and dimensions (e.g., length; width; thickness; volume) such that the moving portion of the apparatus 300 has a mass (e.g., weight) configured to achieve a predetermined resonant frequency for the oscillating or vibrating motion (e.g., in a range of 250 Hz to 3 kHz; about 750 Hz). Examples of such materials of the at least one mass 346 include but are not limited to: tungsten; tungsten alloy; osmium; osmium alloy.

In certain implementations, the at least one piezoelectric element 360 is a unitary (e.g., single; monolithic) component comprising at least one piezoelectric material, while in certain other implementations, the at least one piezoelectric element 360 comprises separate components, one or more of which each comprising at least one piezoelectric material. Examples of piezoelectric materials compatible with certain implementations described herein include but are not limited to: quartz; gallium orthophosphate; langasite; barium titanate; lead titanate; lead zirconate titanate; potassium niobate; lithium niobate; lithium tantalate; sodium tungstate; sodium potassium niobate; bismuth ferrite; sodium niobate; polyvinylidene fluoride; other piezoelectric crystals, ceramics, or polymers. The at least one piezoelectric element 360 of certain implementations comprises two or more layers in mechanical communication with one another (e.g., bonded together) into a unitary component, at least one of the layers comprising at least one piezoelectric material (e.g., unimorph having one piezoelectric layer and a non-piezoelectric layer; bimorph having two piezoelectric layers). The unitary component can comprise other non-piezoelectric materials, such as a bonding material (e.g., adhesive; epoxy; metal) between the piezoelectric layers and/or electrically conductive material (e.g., metal) configured to apply electrical voltage signals to the piezoelectric layers.

In certain implementations, the at least one piezoelectric element 360 is substantially planar, while in certain other implementations, the at least one piezoelectric element 360 is non-planar. For example, the at least one piezoelectric element 360 can comprise a unitary, plate (e.g., sheet; disc-shaped) and can comprise the portion 352 substantially at a center of the at least one spring 350 affixed to the bobbin 310 (e.g., FIG. 2A) or affixed to the coupling portion 380 (e.g., FIG. 2B). The piezoelectric plate can have a length extending between two portions of the perimeter of the piezoelectric plate and across the central portion 352, and a width extending perpendicularly to the length between two other portions of the perimeter of the piezoelectric plate and across the central portion 352. For example, the length can be in a range of 6 millimeters to 30 millimeters (e.g., in a range of 10 millimeters to 20 millimeters), the width can be in a range of 6 millimeters to 30 millimeters (e.g., in a range of 20 millimeters to 20 millimeters), and a thickness in a range of less than 2 millimeters (e.g., less than 1 millimeter; greater than 300 microns). In certain other implementations, the at least one piezoelectric element 360 comprises a plurality of arms, each arm having a first end affixed to the bobbin 310 (e.g., FIG. 2A) or the coupling portion 380 (e.g., FIG. 2B) and a second end affixed to the at least one counterweight assembly 340. Each arm of the at least one piezoelectric element 360 can have a length extending between the two end portions of the arm and a width extending perpendicularly to the length between two side portions of the arm.

FIGS. 3A-3D schematically illustrates various example apparatus 300 in accordance with certain implementations described herein. A portion 352 of the at least one spring 350 is affixed (e.g., glued; epoxied; welded; soldered; clamped) to the bobbin 310 and the at least one counterweight assembly 340 is configured to move relative to the bobbin 310 in response to the magnetic fields (e.g., the at least one counterweight assembly 340 is configured to undergo vibratory motion in response to an oscillating magnetic field generated by the bobbin 310). The at least one counterweight assembly 340 of FIGS. 3A-3D comprises a first counterweight assembly 340*a* and a second counterweight assembly 340*b*, the bobbin 310 between the first counterweight assembly 340*a* and the second counterweight assembly 340*b*. The apparatus 300 of each of FIGS. 3A-3D comprises a first spring 350*a* in mechanical communication with a first portion of the bobbin 310 (e.g., at a top side of the apparatus 300) and a second spring 350*b* in mechanical communication with a second portion of the bobbin 310 (e.g., at a bottom side of the apparatus 300) spaced from the first portion of the bobbin 310. The first spring 350*a* comprises a first piezoelectric element 360*a* (e.g., having a substantially planar structure with the central portion 352 in mechanical communication with the bobbin 310 and at least one peripheral portion 354 in mechanical communication with the at least one counterweight assembly 340). The first and second counterweight assemblies 340*a,b* are configured to move (e.g., vibrate) up and down (denoted by the two double-headed arrows) relative to the bobbin 310 in response to oscillating magnetic fields emanating from the bobbin 310, thereby flexing the first and second springs 350*a,b* about the bobbin 310 and applying respective restoring forces to the first and second counterweight assemblies 340*a,b*.

Figure 3A:
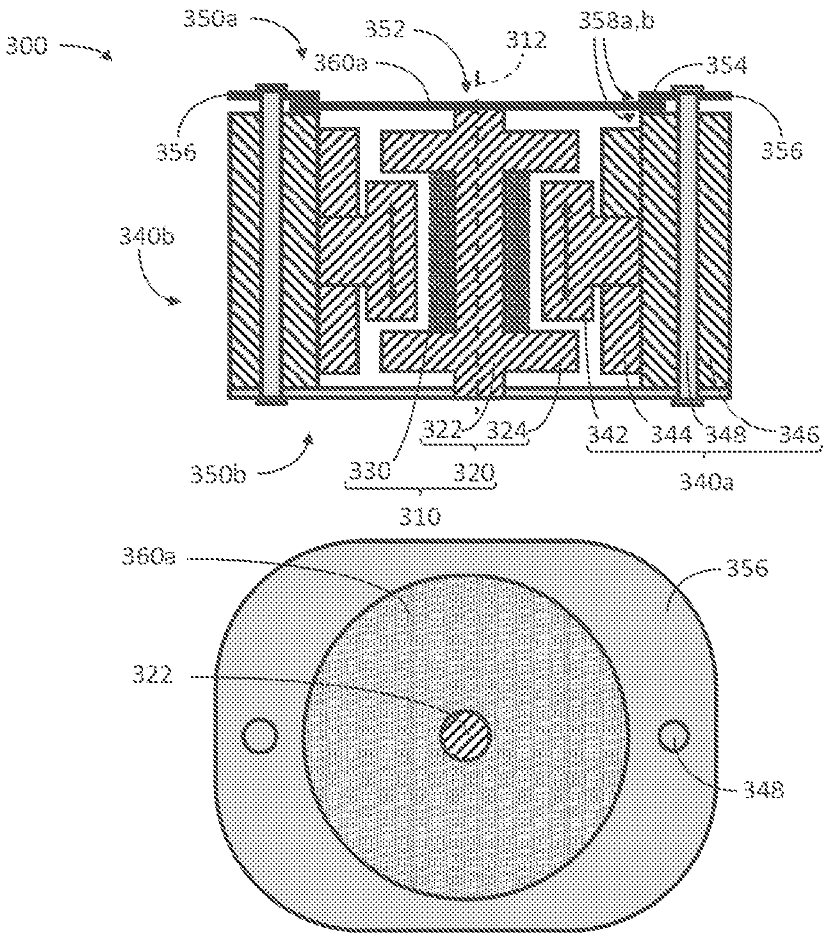
FIGS. 3A-3D schematically illustrates various example apparatus in accordance with certain implementations described herein.

FIG. 3A schematically illustrates a cross-sectional view and a top view of an example apparatus 300 in accordance with certain implementations described herein. The first spring 350*a* of FIG. 3A comprises at least one metal coupler 356 (e.g., sheet; plate; comprising tungsten or spring steel with a thickness of at least 50 microns) in mechanical communication with the first piezoelectric element 360*a* and with the at least one counterweight assembly 340. In certain implementations, as shown in FIG. 3A, the first spring 350*a* further comprises a first cushion 358*a* affixed to (e.g., glued; epoxied) and sandwiched between the at least one metal coupler 356 and the at least one peripheral portion 354 and a second cushion 358*b* affixed to (e.g., glued; epoxied) and sandwiched between the at least one peripheral portion 354 and the at least one counterweight assembly 340. The at least one counterweight assembly 340 can comprise at least one elongate coupler 348 (e.g., rivet; screw) affixed to the at least one metal coupler 356 and to the at least one mass 346. The first cushion 358*a* and the second cushion 358*b* comprise a flexible material (e.g., silicone; Viton or other elastomer material) configured to allow the first piezoelectric element 360*a* to change shape and/or dimensions while remaining in mechanical communication with the at least one metal coupler 356 and the at least one counterweight assembly 340. For example, the first and second cushions 358*a,b* can be substantially rigid to compression in a direction perpendicular to the first piezoelectric element 360*a* while allowing motion of the at least one peripheral portion 354 parallel to the first piezoelectric element 360*a* (e.g., radial expansion and contraction of the first piezoelectric element 360). In certain implementations, the second spring 350*b* is a metal spring (e.g., a metal sheet or plate having a central portion affixed to the bobbin 310 and a peripheral portion affixed to the at least one counterweight assembly 340).

Figure 3B:
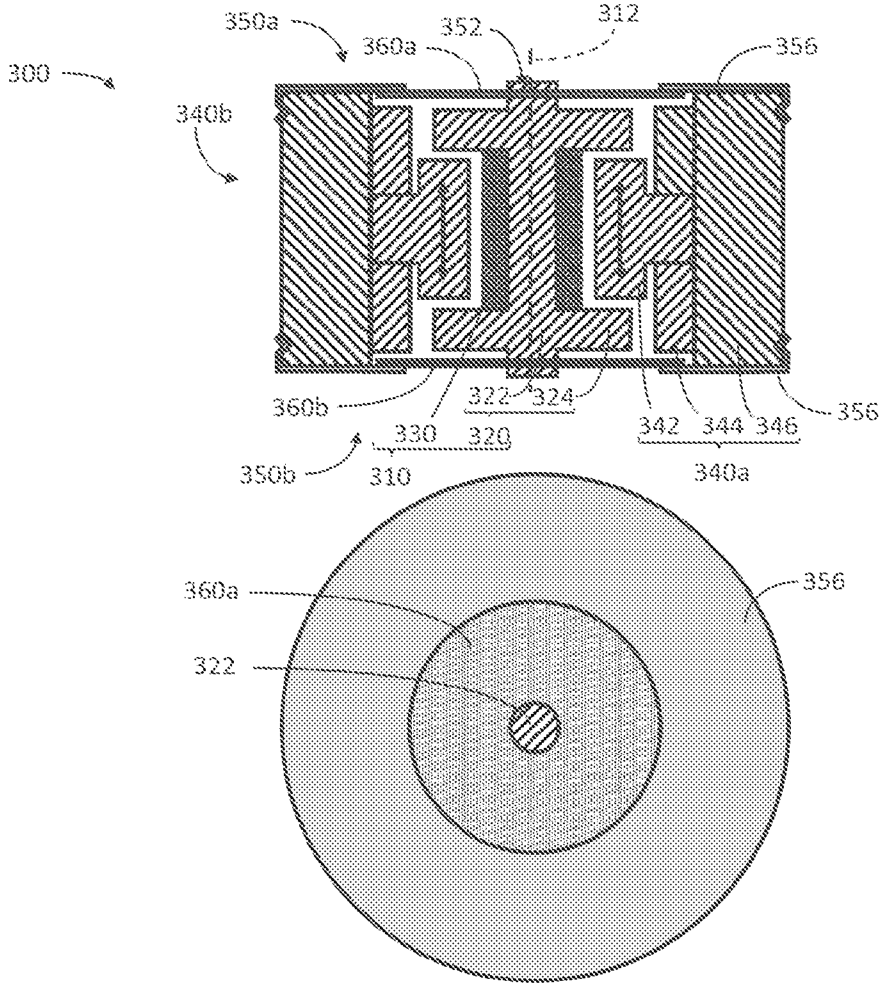

FIG. 3B schematically illustrates a cross-sectional view and a top view of another example apparatus 300 in accordance with certain implementations described herein. The first spring 350*a* of FIG. 3B comprises at least one metal coupler 356 (e.g., clip; clamp; comprising tungsten or spring steel with a thickness of at least 50 microns) in mechanical communication with the first piezoelectric element 360*a* and with the at least one counterweight assembly 340. In certain implementations, as shown in FIG. 3B, the at least one peripheral portion 354 is affixed (e.g., glued; epoxied) to a bottom side of the at least one metal coupler 356, while in certain other implementations, the at least one peripheral portion 354 is affixed (e.g., glued; epoxied) to a top side of the at least one metal coupler 356. The at least one metal coupler 356 is configured to clip onto the at least one counterweight assembly 340. In certain implementations, the second spring 350*b* comprises at least one metal coupler 356 and a second piezoelectric element 360*b* affixed to the at least one metal coupler 356 in the same or similar manner as in the first spring 350*a*.

Figure 3C:
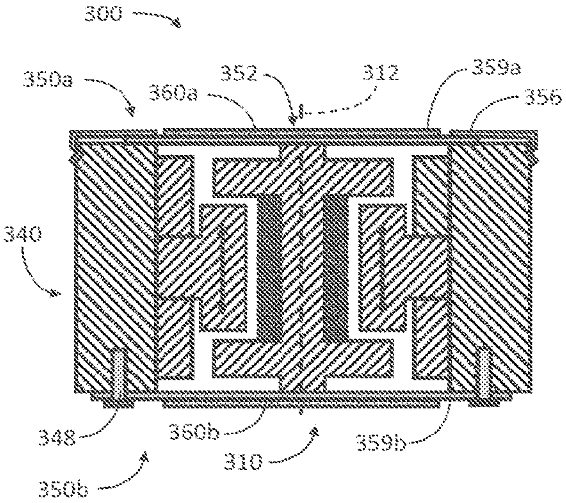

FIG. 3C schematically illustrates a cross-sectional view of another example apparatus 300 in accordance with certain implementations described herein. The first spring 350*a* of FIG. 3C comprises at least one metal coupler 356 (e.g., clip; clamp; comprising tungsten or spring steel with a thickness of at least 50 microns) affixed (e.g., glued; epoxied; welded; soldered) to a first backplate 359*a* comprising a metal sheet or plate (e.g., comprising tungsten or spring steel with a thickness of at least 50 microns) extending across a region between two portions of the at least one metal coupler 356 and in mechanical communication with the bobbin 310, and the first piezoelectric element 360*a* is affixed (e.g., glued; epoxied) to the first backplate 359*a*. The second spring 350*b* of FIG. 3C comprises a second backplate 359*b* and a second piezoelectric element 360*b* affixed (e.g., glued; epoxied) to the second backplate 359*b*. The second backplate 359*b* is affixed to the at least one counterweight assembly 340 by at least one elongate coupler 348 (e.g., rivet; screw). Alternatively, the first backplate 359*a* and/or the second backplate 359*b* can be glued or epoxied to the at least one counterweight assembly 340. In certain implementations, the first backplate 359*a* and/or the second backplate 359*b* act as a "spine" to the respective first and/or piezoelectric elements 360*a,b* to facilitate attachment of the first spring 350*a* and/or the second spring 350*b* to the bobbin 310 and/or to the at least one counterweight assembly 340.

Figure 3D:
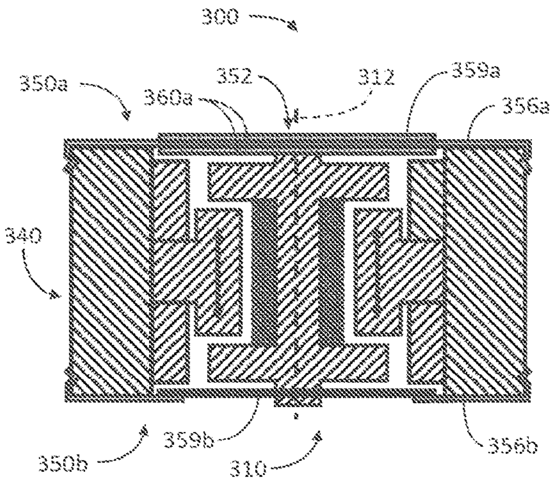

FIG. 3D schematically illustrates a cross-sectional view of another example apparatus 300 in accordance with certain implementations described herein. The first spring 350*a* of FIG. 3D comprises a first metal coupler 356*a* (e.g., clip; clamp; comprising tungsten or spring steel with a thickness of at least 50 microns) affixed (e.g., glued; epoxied) to the bobbin 310 and to the at least one counterweight assembly 340. The first metal coupler 356*a* of FIG. 3D serves as the first backplate 359*a* (e.g., extending across the full width of the apparatus 300). The first spring 350*a* of FIG. 3D further comprises a pair of first piezoelectric elements 360*a* affixed to the first metal coupler 356*a* (e.g., with the first metal coupler 356*a* sandwiched between the two first piezoelectric elements 360*a*). In certain other implementations, a single piezoelectric element 360*a* is affixed to a top surface or to a bottom surface of the first metal coupler 356*a*. The second spring 350*b* of FIG. 3D comprises a second backplate 359*b* affixed (e.g., glued; epoxied) to the at least one metal coupler 356*b*. In certain implementations, the second spring 350*b* does not comprise a piezoelectric element (e.g., as shown in FIG. 3D), while in certain other implementations, the second spring 350*b* comprises at least one second piezoelectric elements (e.g., a pair of second piezoelectric elements affixed to and sandwiching the second backplate 359*b* therebetween).

Figure 4A:
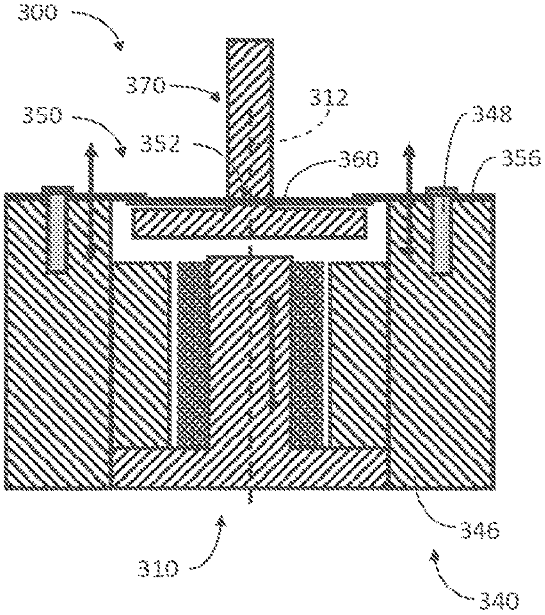
FIGS. 4A and 4B schematically illustrate two example apparatus in accordance with certain implementations described herein.
Figure 4B:
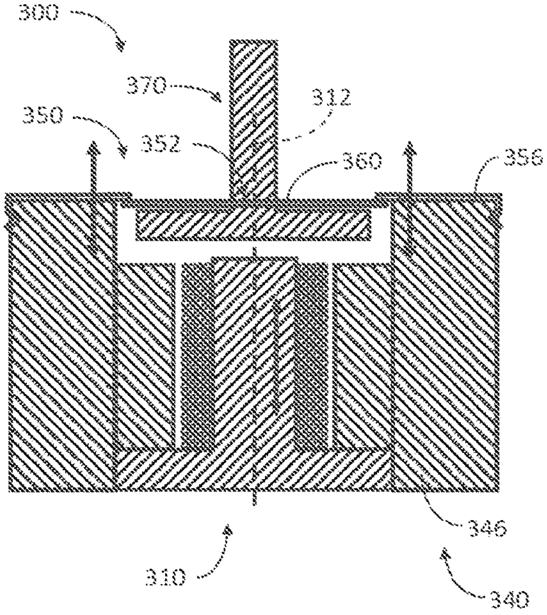

FIGS. 4A and 4B schematically illustrate two example apparatus 300 in accordance with certain implementations described herein. As schematically illustrated by FIG. 4A, the at least one spring 350 comprises at least one metal coupler 356 (e.g., sheet; plate; comprising tungsten or spring steel with a thickness of at least 50 microns) in mechanical communication with the at least one piezoelectric element 360 (e.g., glued; using epoxy) and with the at least one counterweight assembly 340. The at least one counterweight assembly 340 can comprise at least one elongate coupler 348 (e.g., rivet; screw) affixed to the at least one metal coupler 356 and to the at least one mass 346. As schematically illustrated by FIG. 4B, the at least one spring 350 comprises at least one metal coupler 356 (e.g., clip; clamp; comprising tungsten or spring steel with a thickness of at least 50 microns) in mechanical communication with the at least one piezoelectric element 360 and with the at least one counterweight assembly 340. In certain implementations, as shown in FIG. 4B, the at least one piezoelectric element 360 is affixed (e.g., glued; epoxied) to a bottom side of the at least one metal coupler 356, while in certain other implementations, the at least one piezoelectric element 360 is affixed (e.g., glued; epoxied) to a top side of the at least one metal coupler 356. The at least one metal coupler 356 is configured to clip onto the at least one counterweight assembly 340.

In certain implementations (e.g., for each of the example apparatus 300 of FIGS. 2A-2B, 3A-3D, and 4A-4B), the at least one piezoelectric element 360 is configured to respond to electrical signals applied by a plurality of electrodes (not shown) of the apparatus 300 by changing shape (e.g., bending) and/or by changing at least one dimension (e.g., becoming longer or shorter), thereby moving the at least one counterweight assembly 340 and/or modifying a spring constant of the at least one spring 350. For example, in response to oscillating electrical current flowing through the coil 330, the apparatus 300 can be operated as an electromagnetic transducer generating first vibrations of the at least one counterweight assembly 340, and in response to oscillating electrical signals applied to the at least one piezoelectric element 360, the apparatus 300 can be operated as a piezoelectric transducer generating second vibrations of the at least one counterweight assembly 340. The first vibrations of the at least one counterweight assembly 340 resulting from the magnetic fields generated by the bobbin 310 can be generated in parallel and/or in series with (e.g., simultaneously and/or sequentially with) the second vibrations of the at least one counterweight assembly 340 resulting from the electrical signals applied to the at least one piezoelectric element 360. The apparatus 300 can utilize the same electronic circuitry (e.g., amplifiers) or different electronic circuitry to apply the electrical signals to the at least one piezoelectric element 360 and the electrical currents to the at least one coil 330 of the bobbin 310.

Figure 5A:
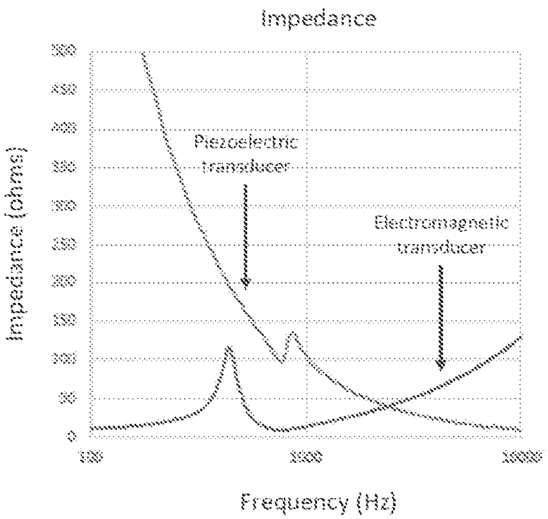
FIGS. 5A and 5B are an example plot of the measured impedance and sensitivity, respectively, as a function of vibrational frequency for (i) an example electromagnetic transducer and (ii) an example piezoelectric transducer in accordance with certain implementations described herein.
Figure 5B:
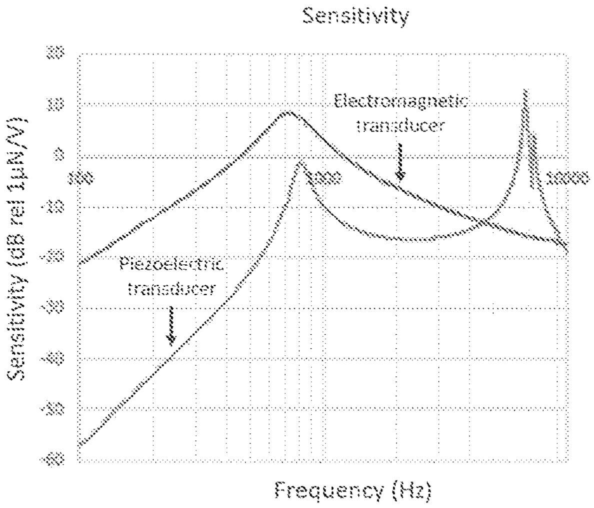

FIGS. 5A and 5B are an example plot of the measured impedance and sensitivity, respectively, as a function of vibrational frequency for (i) an example electromagnetic transducer and (ii) an example piezoelectric transducer in accordance with certain implementations described herein. As can be seen in FIG. 5A, the piezoelectric transducer has higher impedance (and higher capacitive load) than does the electromagnetic transducer at lower vibrational frequencies (e.g., below about 2-3 kHz) and has lower impedance (and lower capacitive load) than does the electromagnetic transducer at higher vibrational frequencies (e.g., above about 2-3 kHz).

In certain implementations, the first vibrations (e.g., from the apparatus 300 being operated as an electromagnetic transducer) can be in a first range of vibrational frequencies and the second vibrations (e.g., from the apparatus 300 being operated as a piezoelectric transducer) can be in a second range of vibrational frequencies different from the first range of vibrational frequencies. In certain implementations, the first and second ranges of vibrational frequencies are selected to take advantage of the relative attributes of the apparatus 300 (e.g., impedance; capacitive load) as an electromagnetic transducer and/or as a piezoelectric transducer. For example, the second range of vibrational frequencies can be higher (e.g., high frequency output; greater than about 2 kHz) than the first range of vibrational frequencies (e.g., low frequency output; less than about 2 kHz). For another example, the second range of vibrational frequencies can overlap at least a portion of the first range of vibrational frequencies (e.g., the at least one piezoelectric element 360 can drive some high frequency output and some low frequency output).

In certain implementations, electrical signals having a non-zero and substantially constant (e.g., DC) component are applied to the at least one piezoelectric element 360 to adjust at least one physical parameter affecting the operation of the apparatus 300 as a transducer (e.g., electromagnetic transducer; piezoelectric transducer). The non-zero DC component of the electrical signals can be applied to the at least one piezoelectric element 360 of certain implementations to adjust (e.g., lengthen; shorten; bend) the at least one piezoelectric element 360, thereby adjusting (e.g., increasing; decreasing) the spring constant of the at least one spring 350. For example, by applying electrical signals with a predetermined non-zero DC component, the at least one spring 350 can be modified (e.g., lengthened; shortened; bent) such that the natural vibration frequency of the apparatus 300 is set to a value offset from the natural vibration frequency of the apparatus 300 with a zero DC component. For another example, a predetermined non-zero DC component can be used to adjust the stiffness (e.g., resistance to bending) of the at least one spring 350 (e.g., increasing the spring constant to stiffen the at least one spring 350; decrease the spring constant to make the at least one spring 350 less stiff) to achieve a predetermined balance point and/or to compensate an off-centered balance point.

In certain implementations, the non-zero DC component can be used to achieve in situ adjustment of the performance of the apparatus 300 as a transducer (e.g., increasing sensitivity of the apparatus 300 to provide the recipient with more output). For example, the at least one piezoelectric element 360 can be adjusted such that an air gap 370 between the bobbin 310 and the at least one counterweight assembly 340 (e.g., as shown in FIG. 2A) and/or between the bobbin 310 and the abutment 380 (e.g., as shown in FIG. 2B) is controllably modified to achieve a predetermined sensitivity and/or a predetermined resonant frequency. The non-zero DC component can be provided from circuitry of the apparatus 300 (e.g., triggered by a button or other input device operated by the recipient; automatically controlled by a scene classifier of a sound processor in operative communication with the apparatus 300).

Figure 6:
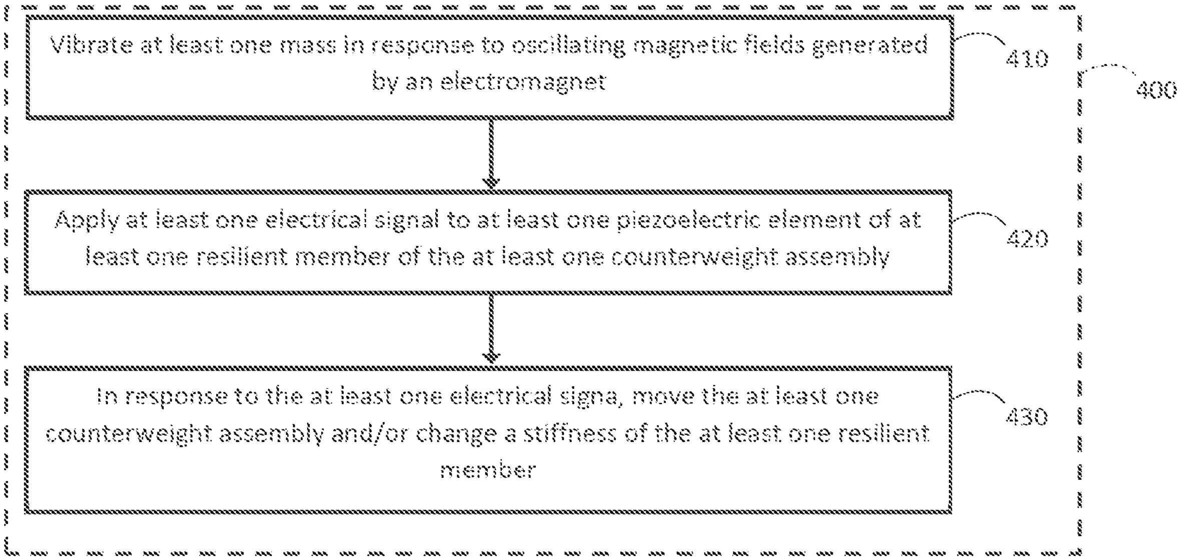
FIG. 6 is a flow diagram of an example method in accordance with certain implementations described herein.

FIG. 6 is a flow diagram of an example method 400 in accordance with certain implementations described herein. In an operational block 410, the method 400 comprises vibrating at least one mass in response to oscillating magnetic fields generated by an electromagnet, the at least one mass in mechanical communication with at least one resilient member comprising at least one piezoelectric element. For example, the at least one mass (e.g., at least one counterweight assembly 340) can be vibrated by applying oscillating electrical signals to at least one coil (e.g., coil 330) of the electromagnet (e.g., bobbin 310) in operative communication with the at least one mass. For another example, the at least one mass can be vibrated by applying oscillating electrical signals to the at least one piezoelectric element (e.g., piezoelectric element 360 which changes shape and/or length in response to the oscillating electrical signals).

In an operational block 420, the method 400 further comprises applying at least one electrical signal to the at least one piezoelectric element. In certain implementations, applying the at least one electrical signal is performed in parallel (e.g., simultaneously) with vibrating the at least one mass in response to the magnetic fields. In certain implementations, vibrating the at least one mass in response to the magnetic fields comprises vibrating the at least one mass in a first range of vibrational frequencies in response to the oscillating magnetic fields. In certain such implementations, the at least one electrical signal comprises at least one time-varying electrical signal and moving the at least one mass in response to the at least one electrical signal comprises vibrating the at least one mass in a second range of vibrational frequencies in response to the at least one time-varying electrical signal, the second range higher than the first range.

In an operational block 430, the method 400 further comprises, in response to the at least one electrical signal, moving the at least one mass and/or changing a stiffness of the at least one resilient member. In certain implementations, the at least one electrical signal comprises a non-zero DC component and moving the at least one mass in response to the at least one electrical signal comprises offsetting a center position of vibrations of the at least one mass. In certain implementations, the at least one mass, the electromagnet, and the at least one resilient member are components of a bone conduction auditory prosthesis and said moving the at least one mass and/or changing the stiffness of the at least one resilient member modifies an auditory response of the bone conduction auditory prosthesis.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

It is to be appreciated that the implementations disclosed herein are not mutually exclusive and may be combined with one another in various arrangements. In addition, although the disclosed methods and apparatuses have largely been described in the context of various devices, various implementations described herein can be incorporated in a variety of other suitable devices, methods, and contexts. More generally, as can be appreciated, certain implementations described herein can be used in a variety of implantable medical device contexts that can benefit from certain attributes described herein.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the methods and systems are discussed herein in terms of elements labeled by ordinal adjectives (e.g., first, second, etc.), the ordinal adjective are used merely as labels to distinguish one element from another (e.g., one signal from another or one circuit from one another), and the ordinal adjective is not used to denote an order of these elements or of their use.

The invention described and claimed herein is not to be limited in scope by the specific example implementations herein disclosed, since these implementations are intended as illustrations, and not limitations, of several aspects of the invention. Any equivalent implementations are intended to be within the scope of this invention. Indeed, various modifications of the invention in form and detail, in addition to those shown and described herein, will become apparent to those skilled in the art from the foregoing description. Such modifications are also intended to fall within the scope of the claims. The breadth and scope of the invention should not be limited by any of the example implementations disclosed herein but should be defined only in accordance with the claims and their equivalents.

What is claimed is:

1. An apparatus comprising:

a bobbin comprising at least one core and at least one electrically conductive coil wound around at least a portion of the bobbin;

at least one counterweight assembly configured to vibrate with a first range of vibrational frequencies in response to magnetic fields generated by the bobbin; and at least one spring in mechanical communication with the at least one counterweight assembly, the at least one spring configured to resiliently deform in response to movement of the at least one counterweight assembly, the at least one spring comprising at least one piezoelectric element, the at least one piezoelectric element configured to respond to at least one time-varying electrical signal applied to the at least one piezoelectric element by vibrating the at least one counterweight assembly with a second range of vibrational frequencies comprising at least some vibrational frequencies higher than the first range of vibrational frequencies.

2. The apparatus of claim 1, wherein a portion of the at least one spring is affixed to the bobbin and the at least one counterweight assembly is configured to move relative to the bobbin in response to the magnetic fields.

3. The apparatus of claim 1, wherein the at least one counterweight assembly is configured to undergo vibratory motion in response to an oscillating magnetic field generated by the bobbin.

4. The apparatus of claim 1, wherein the at least one spring further comprises at least one metal coupler in mechanical communication with the at least one piezoelectric element and with the at least one counterweight assembly.

5. The apparatus of claim 1, wherein the at least one piezoelectric element comprises a substantially planar structure having a central portion in mechanical communication with the bobbin and at least one peripheral portion in mechanical communication with the at least one counterweight assembly.

6. The apparatus of claim 1, wherein the at least one spring comprises a first spring in mechanical communication with a first portion of the bobbin, the first spring comprising a first piezoelectric element of the at least one piezoelectric element.

7. The apparatus of claim 6, wherein the at least one spring further comprises a second spring in mechanical communication with a second portion of the bobbin, the second portion spaced from the first portion.

8. The apparatus of claim 7, wherein the second spring comprising a second piezoelectric element of the at least one piezoelectric element.

9. The apparatus of claim 1, wherein the at least one counterweight assembly comprises a first counterweight assembly and a second counterweight assembly, the bobbin between the first counterweight assembly and the second counterweight assembly.

10. The apparatus of claim 1, wherein the at least one piezoelectric element is configured to respond to a non-zero DC component of the at least one electrical signal by moving the at least one counterweight assembly.

11. The apparatus of claim 1, wherein a portion of the at least one spring is affixed to an abutment and the at least one counterweight assembly and the bobbin move as a unitary element relative to the abutment in response to the magnetic fields.

12. A method comprising:

vibrating at least one mass at a first vibrational frequency in response to oscillating magnetic fields generated by an electromagnet, the at least one mass in mechanical communication with at least one resilient member comprising at least one piezoelectric element;

applying at least one time-varying electrical signal to the at least one piezoelectric element; and in response to the at least one time-varying electrical signal, vibrating the at least one mass at a second vibrational frequency higher than the first vibrational frequency.

13. The method of claim 12, wherein said applying the at least one time-varying electrical signal is performed in parallel with vibrating the at least one mass at the first vibrational frequency in response to the magnetic fields.

14. The method of claim 12, wherein vibrating the at least one mass in response to the magnetic fields comprises vibrating the at least one mass in a first range of vibrational frequencies in response to the oscillating magnetic fields.

15. The method of claim 12, wherein the at least one time-varying electrical signal comprises a non-zero DC component and the method further comprises moving the at least one mass in response to the non-zero DC component by offsetting a center position of vibrations of the at least one mass.

16. The method of claim 15, wherein the at least one mass, the electromagnet, and the at least one resilient member are components of a bone conduction auditory prosthesis, and said moving the at least one mass modifies an auditory response of the bone conduction auditory prosthesis.

17. An apparatus comprising:

at least one electromagnet;

at least one mass in operative communication with the at least one electromagnet; and at least one resilient member comprising at least one piezoelectric element, the at least one resilient member comprising a first portion affixed to the at least one mass, the at least one mass configured to vibrate in a first range of vibrational frequencies in response to oscillating magnetic fields generated by the at least one electromagnet and to vibrate in a second range of vibrational frequencies in response to at least one time-varying electrical signal applied to the at least one piezoelectric element, the second range of vibrational frequencies comprising at least some vibrational frequencies higher than the first range of vibrational frequencies.

18. The apparatus of claim 17, wherein a second portion of the at least one resilient member is affixed to the at least one electromagnet, the second portion spaced from the first portion.

19. The apparatus of claim 17, wherein a second portion of the at least one resilient member is affixed to a substantially stationary member and the at least one mass and the at least one electromagnet move as a unitary element relative to the substantially stationary member in response to the magnetic fields.

20. The apparatus of claim 17, wherein the at least one piezoelectric element is configured to respond to the at least one time-varying electrical signal oscillating electrical signals by vibrating the at least one mass.

21. The apparatus of claim 17, wherein the at least one piezoelectric element is configured to respond to non-zero and substantially constant electrical signals by modifying a resistance to bending of the at least one resilient member.

22. The apparatus of claim 17, wherein the at least one piezoelectric element is configured to respond to non-zero and substantially constant electrical signals by adjusting at least one gap between the at least one electromagnet and the at least one mass.

23. The apparatus of claim 17, wherein the at least one piezoelectric element is configured to respond to non-zero and substantially constant electrical signals by adjusting at least one gap between the at least one electromagnet and an abutment.

24. The apparatus of claim 17, wherein the at least one electromagnet, the at least one mass, and the at least one resilient member are components of a transducer configured to be implanted on or within a recipient's body.

25. The apparatus of claim 24, wherein the at least one piezoelectric element is configured to respond to non-zero and substantially constant electrical signals by adjusting in situ a sensitivity of the transducer and/or a resonant vibrational frequency of the transducer.

* * * * *